Figure 1:
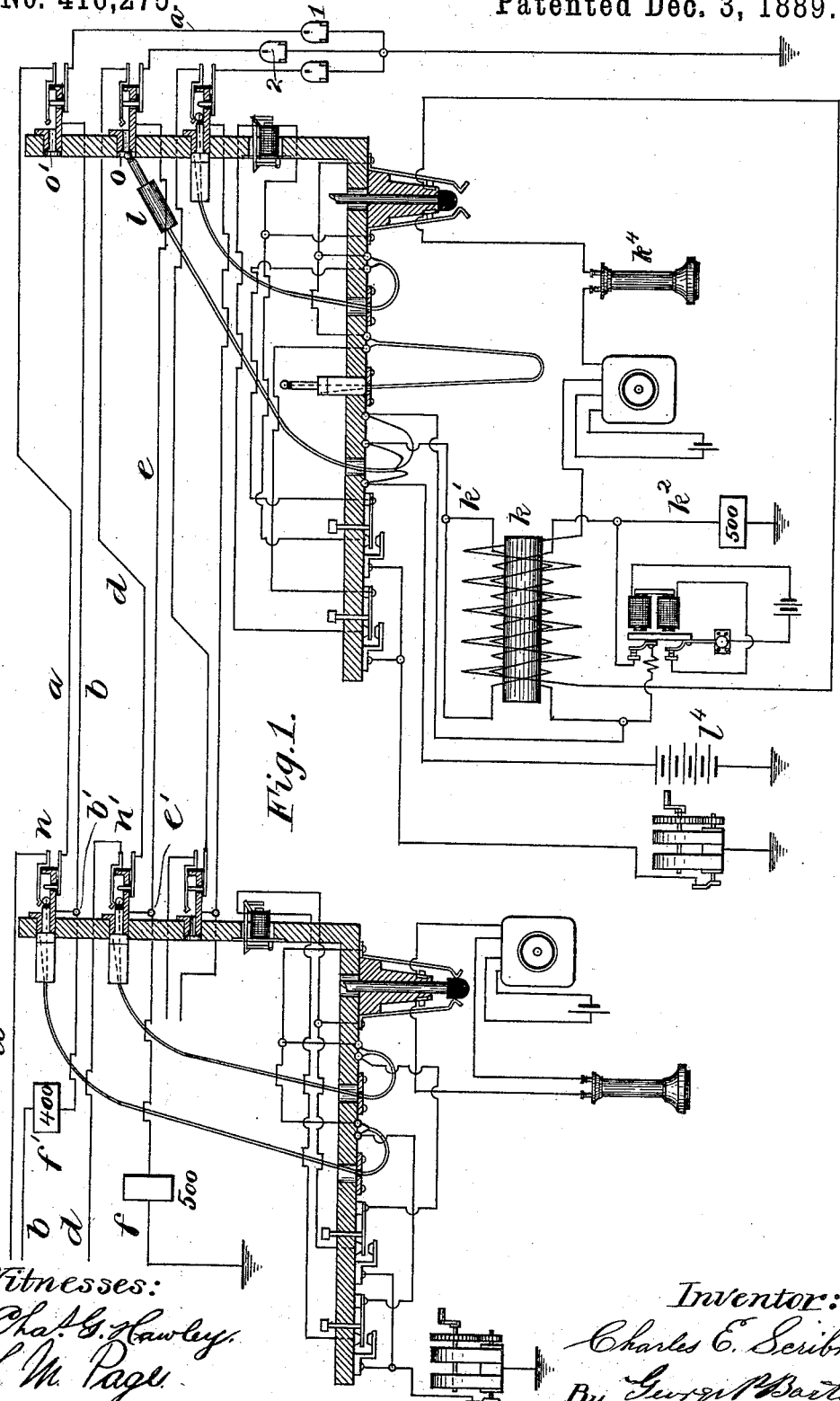

(No Model.)

4 Sheets—Sheet 1.

C. E. SCRIBNER.
TEST CIRCUIT FOR MULTIPLE SWITCH BOARDS.

No. 416,275.

Patented Dec. 3, 1889.

Witnesses:
Chas. G. Hawley.
L. M. Page.

Inventor:
Charles E. Scribner.
By George P. Barton
Attorney.

(No Model.) 4 Sheets—Sheet 3.

C. E. SCRIBNER.
TEST CIRCUIT FOR MULTIPLE SWITCH BOARDS.

No. 416,275. Patented Dec. 3, 1889.

Witnesses:
Chas. G. Hawley.
L. M. Page.

Inventor:
Charles E. Scribner.
By George P. Barton
Attorney (No Model.)

4 Sheets—Sheet 4.

C. E. SCRIBNER.
TEST CIRCUIT FOR MULTIPLE SWITCH BOARDS.

No. 416,275. Patented Dec. 3, 1889.

Witnesses:
Chas. G. Cowley.
L. M. Page.

Inventor:
Charles E. Scribner.
By George P. Barton
Attorney.

UNITED STATES PATENT OFFICE.

CHARLES E. SCRIBNER, OF CHICAGO, ILLINOIS, ASSIGNOR TO THE WESTERN ELECTRIC COMPANY, OF SAME PLACE.

TEST-CIRCUIT FOR MULTIPLE SWITCH-BOARDS.

SPECIFICATION forming part of Letters Patent No. 416,275, dated December 3, 1889.

Application filed June 1, 1888. Serial No. 275,749. (No model.)

*To all whom it may concern:*

Be it known that I, CHARLES E. SCRIBNER, a citizen of the United States, residing at Chicago, in the county of Cook and State of Illinois, have invented a certain new and useful Improvement in Test-Circuits for Multiple Switch-Boards, (Case 148,) of which the following is a full, clear, concise, and exact description, reference being had to the accompanying drawings, forming a part of this specification.

My invention relates to multiple switchboard systems of a telephone-exchange; and its object is to provide ready and reliable means of testing in order that it may be determined at one board whether any line called for at that board is in use or connected at any of the other multiple switch-boards.

My invention is especially designed for use in mixed systems of telephone-exchange—that is to say, in systems embracing metallic-circuit telephone-lines and single-circuit telephone-lines. In such systems it is especially desirable that the work of the operators in receiving and answering calls and connecting and disconnecting the lines shall be uniform at all the boards, and that the work may be the same, no matter what circuits are to be connected together—that is to say, whether a metallic circuit is to be connected with a metallic, a single line with a single line, or single line with a metallic circuit.

My system of testing, as hereinafter described, may be termed the "balance-resistance test system," since in making the test the operator determines whether or not the resistance of a circuit connected with his telephone through a differentially-wound induction-coil is balanced. If balanced, the operator in making the test will hear no buzz or tone in her telephone. On the other hand, if the resistance in the circuits including the different differential windings of the induction-coil are not balanced a tone or buzz will be heard in the operator's telephone.

My invention consists, first, in balancing the resistance of one limb of the metallic circuit and the resistance of the test-wire of each of the single-wire circuits and connecting and testing apparatus so arranged that it may be determined at one board whether a line wanted is in use or connected to any other board.

My invention consists, second, in a test-circuit connected with the test-pieces of the switches of a telephone-line on the different boards, said test-wire passing to ground through a fixed resistance.

My invention consists, third, in a metallic-circuit telephone-line connected from ground at the central office through the contact-point and spring of several switches distributed on different switch-boards and through the subscriber's station of the line back to the central office and through a resistance, which, added to the resistance of the portion of the line passing through the test-pieces of the switches of the line to ground at the subscriber's station, shall be equal to the fixed resistance included in the single circuits or in one of the primary coils of the induction-coil.

My invention consists, fourth, in the manner of making the connections at the central station of such a metallic circuit.

My invention will be readily understood by reference to the accompanying drawings, in which—

Figure 2:
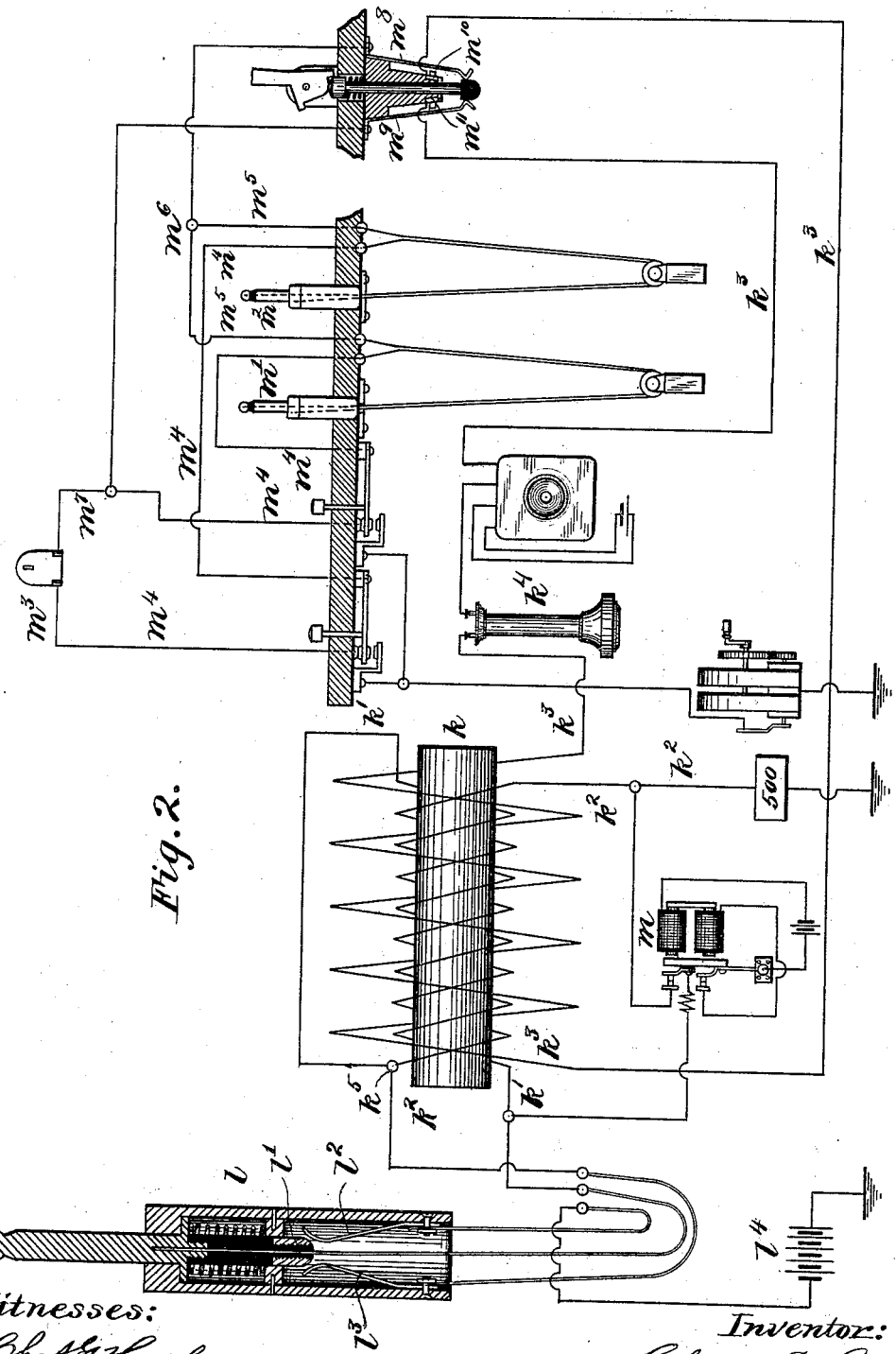
Figure 3:
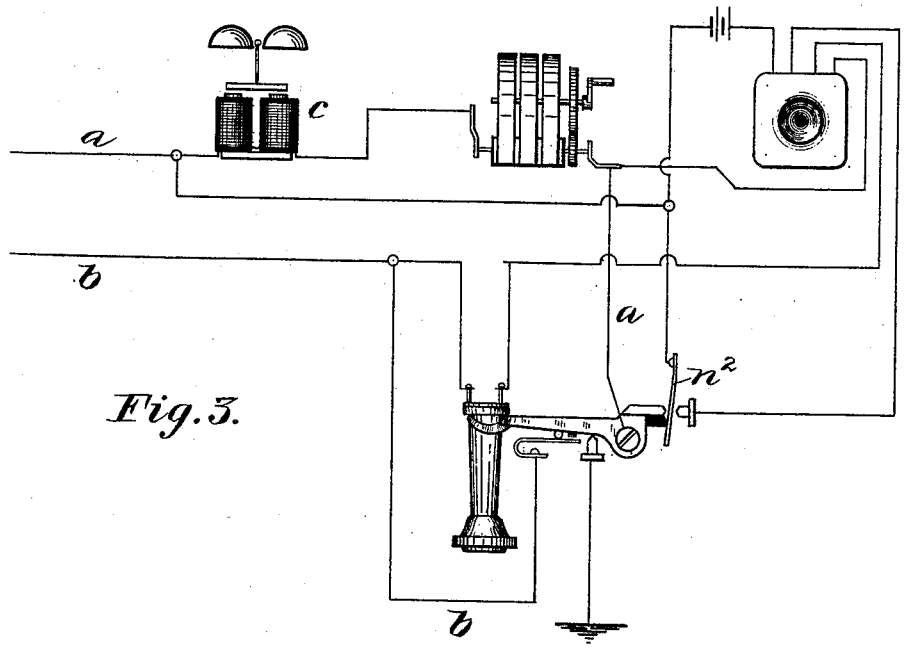
Figure 4:
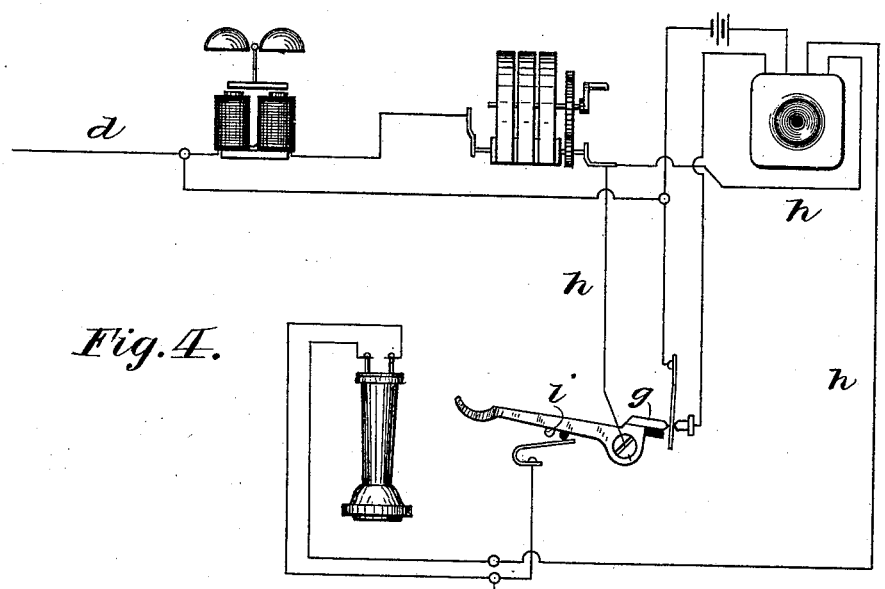
Figure 5:
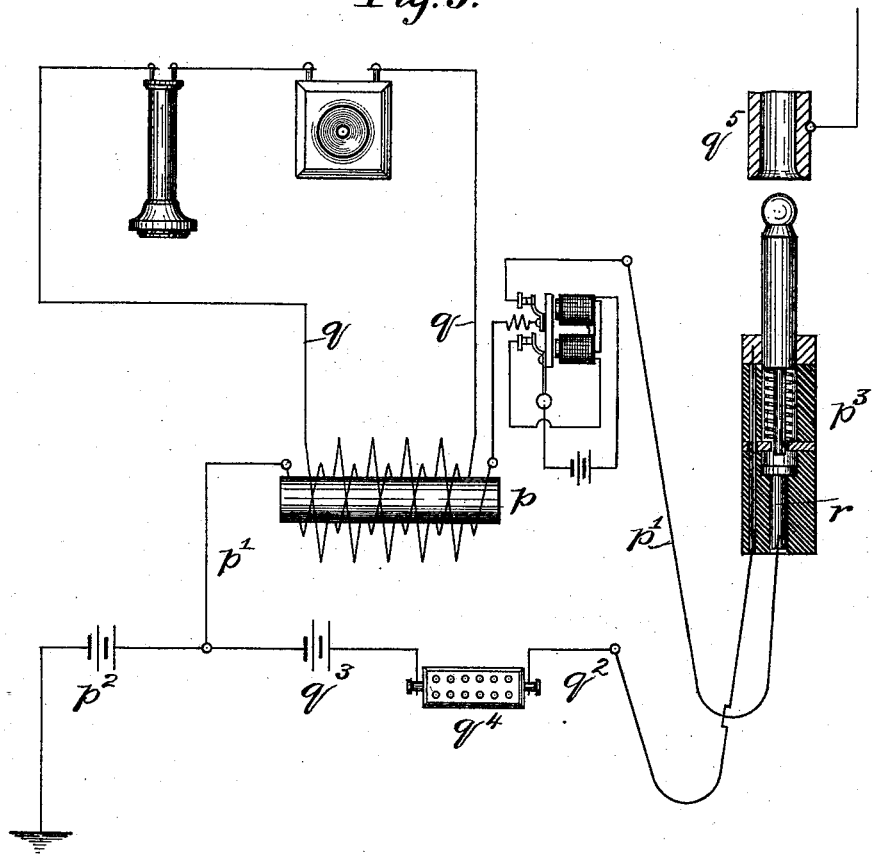
Figure 6:
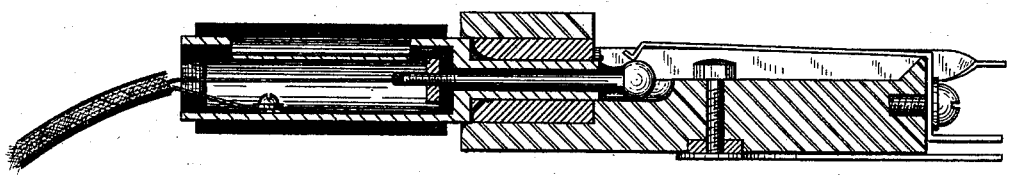

Figure 1, Sheet 1, is a diagram illustrative of my system, two metallic line-circuits and a single-line circuit being shown, each connected with its switches on two different switch-boards, the operator's apparatus being shown at the last board somewhat in detail. Fig. 2, Sheet 2, is a diagram illustrative of the testing and key-board apparatus more in detail. Fig. 3, Sheet 3, is a view illustrative of the apparatus at a subscriber's station of a metallic circuit. Fig. 4 is a diagram illustrative of the apparatus at the subscriber's station of a single-line circuit. Fig. 5 is a diagram illustrative of a modification of the testing apparatus. Fig. 6 is a detailed sectional view of the spring-jack switch with a loop-plug inserted therein.

Like parts are indicated by similar letters of reference in the different figures.

As shown in Fig. 1, the limb or side $a$ of one of the metallic circuits may be traced through a spring-jack switch on each of the multiple switch-boards, and thence through annunciator $l$ to ground. The return portion $b$ of this metallic circuit is connected with the insulated frames of each of the spring-jack switches of the line, and thence extends back, as shown in Fig. 3, through the subscriber's switch to ground at the subscriber's station.

The circuit of limb $a$ of this metallic circuit is shown in Fig. 3 passing through the bell $c$ to the telephone-switch, and thence to ground.

The circuit-wire $d$ of the single circuit (shown in Fig. 1) is connected through a different switch on each of the switch-boards and through annunciator 2 to ground. The wire $e$ connects together the insulated frames or test-pieces of the different switches of said line $d$ and passes through a resistance-coil $f$ to ground at the central office. The line $d$, as shown in Fig. 4, extends to the subscriber's station, and its circuit may be traced normally through the bell to the telephone-switch and from the telephone-switch to ground.

As illustrated in Fig. 4, the telephone is shown removed from the switch, and hence the bell is shunted out, and the circuit may be traced to the contact $g$ of the switch, and thence through the switch to line $h$, and thence through the telephone to ground.

It will be observed that Figs. 3 and 4 illustrate different circuit-connections at the subscriber's station, Fig. 3 being the circuits of a metallic-circuit station, and Fig. 4 being the circuits of a single-line station. When the telephone is removed from the switch, as shown in Fig. 3, the two portions $a$ and $b$ of the metallic circuit are connected together, and the ground is taken off. As shown in Fig. 4, the bell is shunted when the telephone is removed from the hook, and when the telephone is placed upon the hook the contact $g$ is opened, while the contact $i$ is closed directly to ground, thus shunting the telephone and bringing the bell directly into circuit. These circuits, as shown in Fig. 4, are old and well known.

The circuits shown in Fig. 3 I have devised with special reference to my system described herein. It will be understood that the manner of connecting the circuit-lines, both metallic and single, with the switches upon the multiple switch-boards is not new.

I will now describe the key-board apparatus and the manner of receiving and answering the calls, testing the lines called for, and making the connections and disconnections between the lines.

Referring now to Fig. 2, $k$ is the core of a differentially-wound induction-coil. This induction-coil is provided with two equal differentially-wound primary coils $k'$ and $k^2$ and the secondary coil $k^3$, in which may be included the operator's telephone $k^4$. One of the primary coils $k^2$ is connected through resistance—say five hundred ohms—to ground. The other primary coil $k'$ is connected with the tip of the test-plug $l$. To give a distinctive sound in the operator's telephone, I provide a rheotome $m$, or a reed, which is kept in constant vibration by local electro-magnets. The circuit-breaker in connection with the reed has one terminal connected to one differential coil, the other point of the circuit-breaker being connected with the terminal of the other differential coil. If, now, the current be equal through each of the said primary differential coils, this vibration will produce no effect in the operator's telephone. If, however, there be less current flowing through one differential coil than through the other, then the vibration causes a hum or tone in the operator's telephone as long as the coils are closed to battery. This rheotome or vibrator may be the regular Gray harmonic used in Gray's harmonic multiple telegraph system. Any simple vibrator, however, would answer the purpose.

The test-plug $l$ is provided with a metallic tip or stem which is connected with the winding $k'$ of the induction-coil, as before stated. A metallic insulated ring $l'$ is provided on the lower end of the stem, and when the tip of the plug is forced down this metallic ring comes between contact-springs $l^2$ and $l^3$ and serves as an electrical medium or connection between them. Test-battery $l^4$ is shown in the ground-wire connected with spring $l^2$, and hence when the ring $l'$ makes connection between springs $l^2$ and $l^3$ the circuit of battery $l^4$ may be traced to spring $l^3$, and thence to point $k^5$. At this point $k^5$ the circuit divides, passing in one direction around the core of the induction-coil $k$ through coil $k'$ and in the opposite direction around the core through coil $k^2$. If the resistance of the circuits, including coils $k'$ and $k^2$, be the same, the current from battery $l^4$ will be equally divided between the two coils $k'$ $k^2$, and under these conditions no sound or tone will be heard in the telephone $k^4$, included in the secondary coil $k^3$, when said battery $l^4$ is connected in derived circuit with each of said coils. If, however, there be any substantial difference in the resistances of the circuits including said coils, respectively, the fact of such unequal resistances will be indicated by the tone heard in the telephone. The tip of plug $l$, as before stated, is the terminal of coil $k'$. The other coil $k^2$ is connected through resistance—in this case five hundred ohms—to ground. If, then, the tip of plug $l$ be connected with a ground-circuit of five hundred ohms resistance, the resistance in the circuit of each of the primary coils will be balanced and the opposite currents in the two coils will be equal, and hence the core will be neutral.

My system of testing, briefly stated, consists in sending the current from battery $l^4$ in derived circuit through the two equal primary coils of the induction-coil and from the primaries to ground. The resistance in coil $k^2$ will in all cases be five hundred ohms, or the fixed resistance, whatever the amount may be. The resistance included in the circuit of the other coil $k'$ will depend upon the condition of the circuits that are being tested. If the line tested is idle, the resistance will be five hundred ohms, in which case the balance will be established and there would be no sound in the telephone included in the secondary coil. If the line tested is connected or in use, the resistance will be either more or less than five hundred ohms, the amount depending upon the condition of the line tested.

As will be presently explained, if the line tested is a metallic circuit and happens to be connected at the time with another metallic circuit, the resistance will be infinite, or, rather, will be measured by the insulation of the metallic circuit formed by uniting the two subscribers' lines in metallic circuit. If the connection is made with the test-piece of a single line which is connected with another single line, the circuit from the top of the test-plug, as will be presently explained in detail, will be in derived circuit through two single circuits, each derived circuit containing five hundred ohms resistance, and hence the sum of the resistances of the two circuits will be two hundred and fifty ohms.

In case a metallic circuit is connected to a single circuit the test would be made through a derived circuit to ground containing five hundred ohms resistance and through the metallic circuit and its connected single circuit to ground. This combined or joint resistance of the derived circuits will in practice be always less than five hundred ohms, the exact amount being determined by the resistance of the metallic circuit and its connected single circuit.

I will now describe the circuit through telephone $k^4$ and the connections of said circuit with the strands of the flexible cords, as shown in Fig. 2. The plugs $m'$ and $m^2$ constitute an ordinary pair of double-pointed loop-plugs. The clearing-out annunciator $m^3$ is connected in the strand which connects the tips of the plugs. Thus, tracing from the tip of plug $m'$, the circuit may be traced by wire $m^4$ through a usual calling-key and the annunciator $m^3$ to another calling-key, and thence, as indicated, to the tip of plug $m^2$. The insulated metallic sleeves upon the shanks of plugs $m'$ $m^2$ are connected together, as indicated, by wire $m^5$. Half-connections $m^6$ and $m^7$ are run from the different strands of the cords to springs $m^8$ $m^9$ of the listening-in switch or loop-switch. When the piston of the loop-switch is in the position shown in Fig. 2, the springs $m^8$ $m^9$ are lifted from contacts $m^{10}$ and $m^{11}$. On raising the piston said springs close upon said contacts, respectively. Tracing the circuit $k^3$ from these contact-points it will be found to include the secondary winding of the induction-coil and the telephone $k^4$. Thus it appears that the telephone $k^4$ may be included in, as it were, a bridge-wire from one strand of the flexible cord to the other strand—that is to say, a bridge-wire connecting with strand $m^5$ at $m^6$ and with strand $m^4$ at $m^7$, as heretofore described.

As before stated, the resistance included in one of the primary coils of the induction-coil at the central office is fixed. I have mentioned five hundred ohms as a proper amount for this fixed resistance. In Fig. 1 I have shown in wire $e$ a resistance $f$ of five hundred ohms—that is to say, a resistance equal in amount to that in the coil $k^2$. In the limb $b$ of the metallic circuit I have shown a resistance $f'$ of four hundred ohms. The amount of this resistance $f'$ must be such that the resistance of limb $b$ measured from the central office to the subscriber's station will be equal to five hundred ohms. I have assumed, therefore, that the resistance of this wire without the four hundred ohms resistance would be one hundred ohms. In every case the resistance of the wire on limb $b$ of each metallic circuit must be measured. The amount of resistance to be added will then be determined by the difference between the fixed resistance and the ascertained resistance of the line.

In Fig. 1 I have shown a pair of plugs inserted in the switches $n$ $n'$, spring-jack $n$ being of a metallic circuit and spring-jack $n'$ being of a single-line circuit. Suppose, now, the telephone of the metallic circuit to be removed from the switch and the switch-lever lifted from its ground-connection, and assume that the circuit at the subscriber's station of line $d$ to be as shown in Fig. 4. The circuit thus formed may be traced from ground, as shown in Fig. 4, through the telephone at said station, and thence, as indicated by wire $h$, to the switch, and by contact $g$ of the switch, as shown, to line $d$, and thence to the spring of the spring-jack $n'$, as shown in Fig. 1, thence to the tip of the plug inserted in said switch and by the strand of cord connecting with said tip through the clearing-out annunciator, and thence to the tip of the plug inserted in spring-jack $n$, and thence by limb $a$ of the metallic circuit to the contact-spring $n^2$. (Shown in Fig. 3.) The telephone being removed from the switch-lever, this contact-spring $n^2$ will be connected with the switch-lever, and hence the circuit of limb $a$ may be traced to said spring $n^2$, thence to the switch-lever, and thence through the microphone and telephone to line $b$, and thence over line $b$ to the central office and to the frame or test-ring of switch $n$. This frame or test-ring being in contact with the sleeve of the plug, the circuit will be traced to said sleeve and through the strand of the cord to the sleeve of the plug inserted in switch $n'$ of the single-line circuit. This sleeve being in contact with the frame or test-piece of spring-jack $n'$, the circuit may be traced from said test-piece to ground through resistance $f$. I have thus traced the circuit formed between a metallic circuit and single-line circuit when connected together.

We will now suppose that at some other board a subscriber asks for a connection with the single line $d$. It is the duty of the operator at the board where the connection is called for to test to ascertain whether or not line $d$ is in use. This is done by touching the tip of plug $l$ to the test-ring $o$ of the switch of line $d$, as shown at the second board in Fig. 1. (For detail of test-plug $l$ see Fig. 2.) The operator not only touches the plug to the test-ring, but presses the tip of the plug against the ring until the battery $l^4$ is looped into the circuit. Having heretofore traced the test-circuits thus formed through the differentially-wound induction-coil in connection with the description of Fig. 2, it will not be necessary to trace them in detail at this point. I wish to state, however, that the battery $l^4$ is connected in derived circuit through the equal differentially-wound primary coils of the induction-coil. One of said coils being connected, as indicated, by wire $k^2$ through a resistance of five hundred ohms to ground, the other winding $k'$ will be connected through the tip of plug $l$ to the test-ring $o$ of the switch of the line which is being tested. Now if the resistance in the circuit including the tip of the plug is equal to the fixed resistance in the other primary coil there will be no tone or sound in the telephone $k^4$. If, however, it is greater or less, it is evident that a tone will be heard. Now, as shown in Fig. 1, the circuit from the tip of plug $l$ may be traced to sleeve $o$, and thence by wire $e$ to point $e'$. At point $e'$ the circuit will divide, one branch going through resistance $f$ to ground. The other branch will go to the sleeve of the plug inserted in the switch $n'$, thence to the sleeve of the plug inserted in switch $n$, thence by wire $b$ through the subscriber's station, as heretofore described with respect to Fig. 3, and thence back by wire $a$ to the tip of the plug inserted in switch $n$, and thence to the tip of the plug inserted in switch $n'$, and thence over line $d$ to ground at the station on said line $d$, as shown in Fig. 4. The amount of the resistance of this telephone-circuit from point $e'$ will depend upon the resistance of the connected lines. As the limb $b$ and the resistance included therein is fixed at five hundred ohms, the whole amount of resistance will be five hundred ohms plus the resistance of the limb $a$ and that of the line $d$, which will be in practice sufficiently low to make the joint resistance of the derived circuits from point $e'$ substantially less than five hundred ohms, and hence the resistance of the circuits including the two primary coils will be out of balance and a tone will be heard in the telephone $k^4$ when plug $l$ is touched to a test-piece $o$—that is to say, the resistance of the circuit which includes the tip of plug $l$ will be less than the fixed resistance, and hence a tone will be heard in the telephone $k^4$, and the operator will know that said single circuit $d$ is busy. Suppose, now, plug $l$ were applied to test-ring $o'$ of a switch of the metallic circuit which is connected with the single-line circuit. The circuit then would be traced from the tip of plug $l$ to said ring $o'$, and thence to point $b'$. From point $b'$ a branch would extend, as shown, through the frame of switch $n$ to the sleeve of the plug inserted therein, thence to the sleeve of the plug inserted in switch $n'$, and thence to the frame of switch $n'$, and thence through resistance $f$ of five hundred ohms to ground. Going back, now, to point $b'$, the other branch may be traced by wire $b$ through the metallic subscriber's station, as described with respect to Fig. 3, and back over line $a$ to the spring of switch $n$, thence to the tip of the plug inserted in switch $n$, thence to the tip of plug inserted in switch $n'$ and to the switch $n'$, and thence over line $d$ to the ground at the single-line subscriber's station, as shown in Fig. 4. We have, then, the same conditions with respect to resistance when testing the metallic circuit as when testing the single-line circuit. Taking $b'$ as the point at which the circuit divides, one branch will contain five hundred ohms resistance and the other will contain more than five hundred ohms resistance, but a resistance so low that the joint resistance of the derived circuit from point $b'$ will be less than five hundred ohms. Thus the circuits containing the different differential windings will be out of balance as to resistance, and the operator listening to telephone $k^4$ will hear a tone in the telephone and know that the line tested is in use or connected at some other board. Suppose, now, that the telephone at the station shown in Fig. 3 were hung up when the tests were made at rings or test-pieces $o$ and $o'$ of the different lines. It is evident that line $b$ would find ground at the metallic subscriber's station, as shown in Fig. 3, and hence, tracing the circuit from $e'$, one branch would go through the five hundred ohms resistance $f$ to ground, as before stated. The other telephone-circuit would go to the sleeve of plug inserted in switch $n$, thence to point $b'$, and thence over line $b$ to ground at the station. (Shown in Fig. 3.) The resistance, then, of each of these derived circuits would be five hundred ohms, and their joint resistance would be, of course, two hundred and fifty ohms. Now, considering the test as made at test-ring $o'$, the circuit would be traced to point $b'$, and thence in one direction through resistance $f'$ over line $b$ to ground, this line $b$ and its resistance $f'$ having together a resistance of five hundred ohms. The other branch from point $b'$ would be traced, as heretofore described, through resistance $f$, of five hundred ohms, and hence the joint resistance of the derived circuits from point $b'$ would be two hundred and fifty ohms. We will now suppose that two single lines were connected together, and that a test were made to determine whether one of such lines were in use. Considering, now, that the resistance $f'$ were five hundred ohms, and that wire $b$, after passing through said resistance $f'$, went directly to ground at the central office the same as wire $e$, we should have the proper arrangement of circuits. Thus, if a test were made at either test-ring $o$ or $o'$, the circuit from the tip of plug $l$ would extend in derived circuit through two resistances of five hundred ohms each, and hence the joint resistance would be two hundred and fifty ohms. I do not consider it necessary to trace the circuits that would be thus formed through in detail.

I have thus described my invention in connection with the testing apparatus consisting, essentially, of the differentially-wound induction-coil and the telephone included in the secondary coil thereof, as shown more clearly in Fig. 2. It is evident, however, that other forms of testing apparatus or resistance-measuring apparatus might be used. I have described, however, the testing apparatus which I consider best for this purpose. Certain features thereof were invented by Charles D. Haskins and myself, jointly, our joint invention consisting, essentially, in the two equal differentially-wound primary coils of the induction-coil connected with a battery, in combination with the rheotome between said coils, the telephone included in the secondary coil of the induction-coil, a fixed resistance in the grounded primary winding, and a switching device for closing the other primary winding to the circuit, including the resistance which is to be measured or compared with the fixed resistance.

The foregoing joint invention forms the subject-matter of an application, Serial No. 274,883, (Case 154,) filed May 24, 1888, for electric-resistance indicator.

In the modification of the testing apparatus which is illustrated in Fig. 5 I provide for measuring or comparing the resistance in the circuit to be tested with a fixed resistance forming a portion of said testing apparatus. This testing apparatus consists, essentially, in the two batteries $p^2$ and $q^3$, placed in the same normally-open ground-circuit $q^2$ with the fixed resistance $q^4$, and a telephone or other current-indicating apparatus connected in a circuit $p'$, branched from the wire $q^2$ at a point between the batteries, with switching apparatus for connecting said branch circuit $p'$ with the wire $q^2$ at a point beyond the resistance, and at the same time connecting the wires so united with the line to be tested. I preferably use an induction-coil $p$ as a portion of my current-indicating apparatus, the primary of said coil being included in the circuit $p'$, while the secondary coil is included in the circuit $q$, which contains the telephone. I also preferably use a rheotome $q'$ in said wire $p'$ for the purpose of continuously interrupting the circuit.

The switching apparatus forming a portion of my testing apparatus is preferably in the form of a test-plug $p^3$. Wire $p'$ is connected with a point $r$ of the test-plug, while wire $q^2$ is connected with the tip of said plug. A coil-spring serves to hold the tip out in the position shown, so as to break the connection between said tip and the contact $r$. By pressing the tip of the plug against a test-ring $q^5$ the spring is compressed and electrical connection is made between the tip and the contact $r$, thus connecting together the two wires $q^2$ $p'$ when the tip is pressed against test-ring $q^5$. By successively pressing the tip of the plug against a test-ring $q^5$, which is the terminal of a ground-circuit, it may be determined whether the resistance of said ground-circuit is the same as the fixed resistance $q^4$. In order that this may be clearly understood, I will consider the effect of the batteries $p^2$ and $q^3$ upon the induction-coil or telephone as the tip of the plug is pressed against the test-piece $q^5$ while the wire $p'$ is successively opened and closed. It will be found that if the batteries $p^2$ and $q^3$ are equal and the resistance of the line connected with $q^5$ to be tested equal to the resistance $q^4$ there would be no sound heard in the telephone. If, however, the resistance of the line connected with $q^5$ shall be either substantially greater or less than the resistance $q^4$, a click or sound will be heard for the following reasons: Assume, now, that batteries $p^2$ and $q^3$ are equal, the wire $p'$ being branched from a point of wire $q^2$ between said batteries. Any currents passing over said wire $p'$ from said batteries will be of opposite polarities, and, the batteries being equal and the resistance of the derived circuit from each of said batteries being equal, the two currents will be neutralized. If, however, the derived circuit from battery $p^2$ have a greater or a less resistance than the circuit from battery $q^3$ through said wire $p'$, current of one polarity or another will be indicated in wire $p'$ by the telephone or other current-indicating instrument included therein. Suppose, first, the resistance of the wire connected with $q^5$ to be five hundred ohms and the resistance of rheostat $q^4$ to be the same. Trace then, first, the derived circuit from battery $p^2$ through wire $p'$ to contact $r$, the tip of the plug, and $q^5$ through five hundred ohms resistance; and, second, trace the derived circuit from battery $q^3$ through wire $p'$ to point $r$, the tip of the plug, and back over wire $q^2$, through resistance $q^4$ of five hundred ohms. It is evident that under this condition the copper current from battery $p^2$ will neutralize the zinc current from battery $q^3$ passing through the indicating-instrument in wire $p'$. If, however, the resistance in the wire connecting with test-piece $q^5$ be substantially more or less than five hundred ohms, there will be no balancing of the copper and zinc currents passing through wire $p'$ when said wire $p'$ is closed as a shunt around resistance $q^4$.

The testing apparatus shown and described in Fig. 5 I have described and claimed specifically in an application, Serial No. 275,752, (Case 156,) filed June 1, 1888, for testing apparatus for multiple switch-boards.

Having thus described my invention, I claim as new and desire to secure by Letters Patent—

1. In a telephone-exchange system, two or more switch-boards to each of which the same telephone-lines are connected, a portion of said telephone-lines being metallic circuits and a portion single-line circuits, the metallic circuits being respectively provided with a ground-connection at the subscriber's station, and the single-wire circuits being each provided with a grounded test-circuit, the grounded test-circuit of each of the different single-line circuits and the return wire or limb of the different metallic circuits being balanced with respect to resistance, substantially as described.

2. In a telephone-exchange system, a telephone-line connecting with a switch on each of two or more switch-boards, a test wire or circuit connected with the insulated test-piece or frame of each of the switches of a line and extending thence to ground, a resistance-coil included in said test-circuit, and resistance-comparing apparatus at one or more of said switch-boards, whereby it may be determined at one board whether said test-wire is crossed or connected with its line at any other board.

3. A metallic telephone-line circuit connected to ground at the subscriber's station and extending in one branch or limb through switches on two or more switch-boards and through annunciator to ground, and the other branch extending from said ground through a resistance-coil at the central office to a test-piece of each of the switches of the line, in combination with switching apparatus at the central office and at the subscriber's station, whereby said limbs may be united in metallic circuit, the ground-connection at the subscriber's station and the connection with the annunciator at the central office being at the same time broken, substantially as and for the purpose specified.

4. In a multiple switch-board system of telephone-exchange, telephone-lines, each connected with a different switch on each of the switch-boards, a portion of said lines being metallic-circuit and a portion of said lines being single-circuit lines, the metallic-circuit lines consisting each, essentially, of two branches or limbs normally grounded at the subscriber's station thereof and extending to the central office, the one branch extending through the spring and contact of each of the switches of the line through an annunciator to ground, the other branch extending through a resistance-coil to a normally-open test-piece of each of said switches, and the single-circuit lines consisting each, essentially, in a wire extending from the subscriber's station thereof through the spring and contact of each of the switches of the line through an annunciator to ground, and each single-circuit line being provided with a test-line circuit connected with a test-piece of each of the switches of the line and extending through resistance to ground, the resistance of the test-wires of the single-circuit lines being made equal to the resistance of the limb of each of the metallic circuits, including the resistance-coil in said limb, substantially as described.

5. A metallic circuit and a single-line circuit looped together by a pair of loop-plugs and flexible cords upon one of the switch-boards in a multiple switch-board system of telephone-exchange, the test-wire of the single-wire circuit including a fixed resistance and a resistance included in the limb $b$ of the metallic circuit, which, added to the resistance of limb $b$, is equal to the fixed resistance, in combination with testing apparatus connected in derived circuit between the said resistances at a test-piece of one of the said lines upon another of the switch-boards, substantially as described.

6. In a telephone-exchange system, the combination, with the telephone-lines connected with different switches upon different switch-boards, of test-circuits, one test-circuit for each telephone-line, each of said test-circuits containing resistance, and a testing device for measuring said resistance, whereby it may be determined, by the comparative amount of resistance in any test-circuit, whether or not the said line is connected or in use.

7. In a telephone-exchange system containing metallic circuits and single-line circuits, of test-circuits, the test-circuit for each single line containing a fixed amount of resistance, and one of the limbs of each of the different metallic circuits containing an amount of resistance equal to the resistance in the single-line test-circuits less the resistance of said limbs, respectively, and resistance measuring or comparing apparatus, whereby it may be determined at any one of the several boards with which said lines are connected whether or not any one of said lines is in use or connected at any other of the boards.

8. In a telephone-exchange system, a series of switch-boards located at the central station, a series of metallic-circuit telephone-lines connecting with each of the said switch-boards and extending therefrom to sub-stations, each line being provided at its terminal sub-station with a normal ground-connection, a series of single-wire-circuit telephone-lines also connecting with each switch-board, extending therefrom to other sub-stations, and each provided at the central station with a grounded test-circuit, the resistance of the said test-circuits of the single-wire lines being made to balance the resistance of the return-wires of the metallic-circuit lines, substantially as hereinbefore described.

In witness whereof I hereunto subscribe my name this 26th day of January, A. D. 1888.

CHARLES E. SCRIBNER.

Witnesses:
GEORGE P. BARTON,
CHAS. G. HAWLEY.